United States Patent
Gee

(10) Patent No.: US 6,343,825 B1
(45) Date of Patent: Feb. 5, 2002

(54) OVER THE ROAD TRAILER WITH ADJUSTABLE BED CONFIGURATION

(76) Inventor: Stuart Gee, 1882 County Rd. K, Colby, KS (US) 67701

( * ) Notice: Subject to any disclaimer, the term of this patent is extended or adjusted under 35 U.S.C. 154(b) by 0 days.

(21) Appl. No.: 09/610,406

(22) Filed: Jul. 5, 2000

(51) Int. Cl.[7] ............ B60P 3/00; B62D 21/00; B62D 24/00; B62D 63/06
(52) U.S. Cl. ............ 296/25; 296/182; 280/789; 280/790; 280/DIG. 8; 414/495
(58) Field of Search ............ 296/181, 182, 296/25; 280/781, 789, 790, DIG. 8; 414/481, 482, 495, 537

(56) References Cited

U.S. PATENT DOCUMENTS 4,747,746 A * 5/1988 Wise ............ 414/481
5,246,241 A * 9/1993 Baver ............ 280/789

FOREIGN PATENT DOCUMENTS

DE 2263937 * 7/1974 ............ 280/789

* cited by examiner

Primary Examiner—D. Glenn Dayoan
Assistant Examiner—Hilary Gutman
(74) Attorney, Agent, or Firm—Shook, Hardy & Bacon LLP

(57) ABSTRACT

An over the road trailer having adjustable sections to provide different trailer configurations. A flat center bed section has a sliding connection at the front with vertical legs of a gooseneck section and a sliding connection at the back with vertical legs of an L-shaped rear section. Hydraulic jacks move the center section up and down to allow the trailer to assume a double drop deck configuration, a step deck configuration, or a straight deck configuration. Separate power operated and manually operated latching systems secure the trailer in each different configuration.

17 Claims, 3 Drawing Sheets

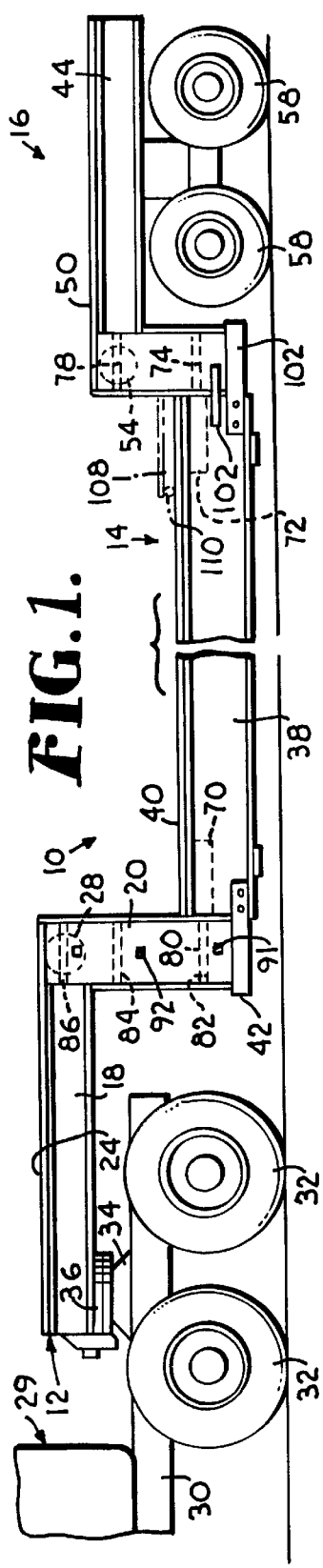
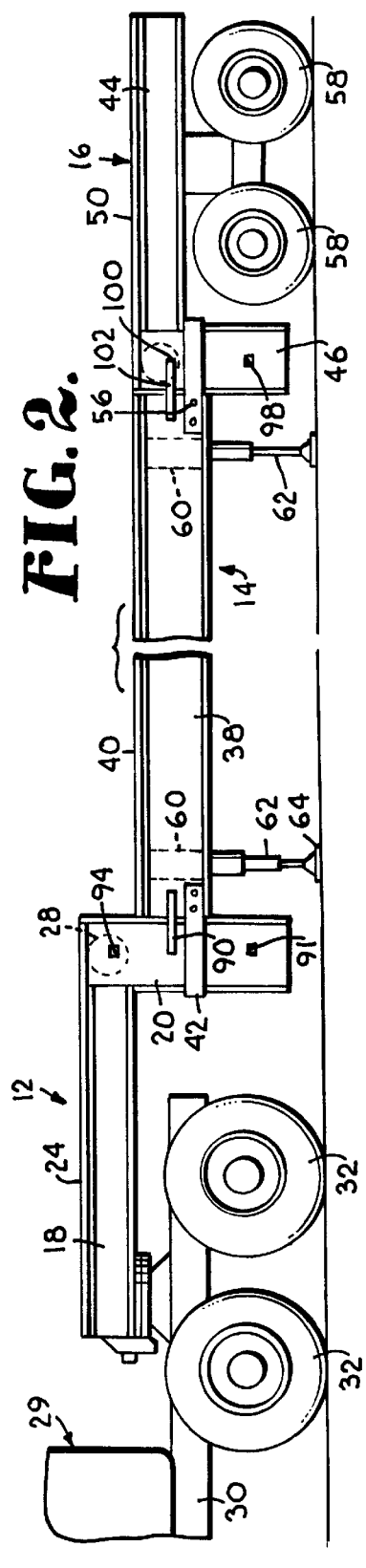
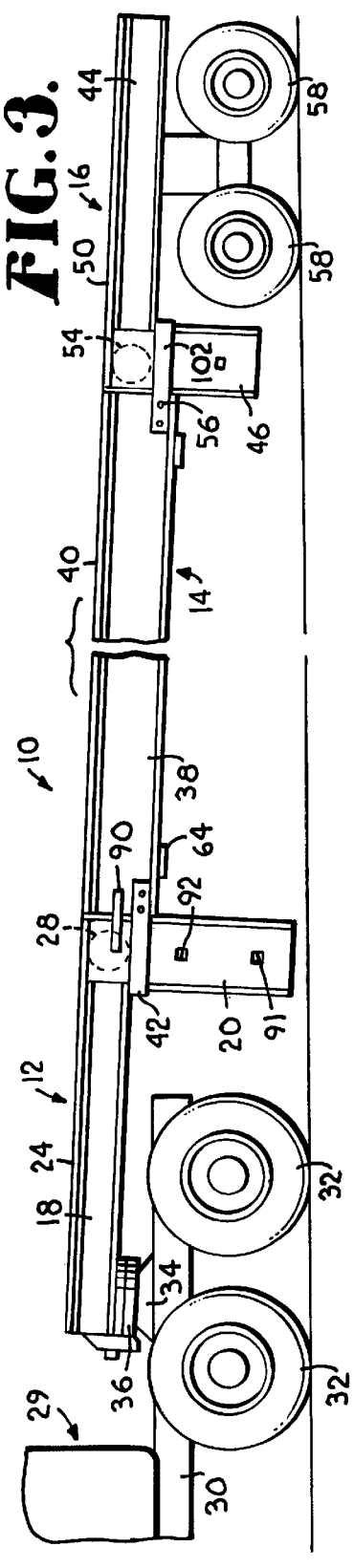

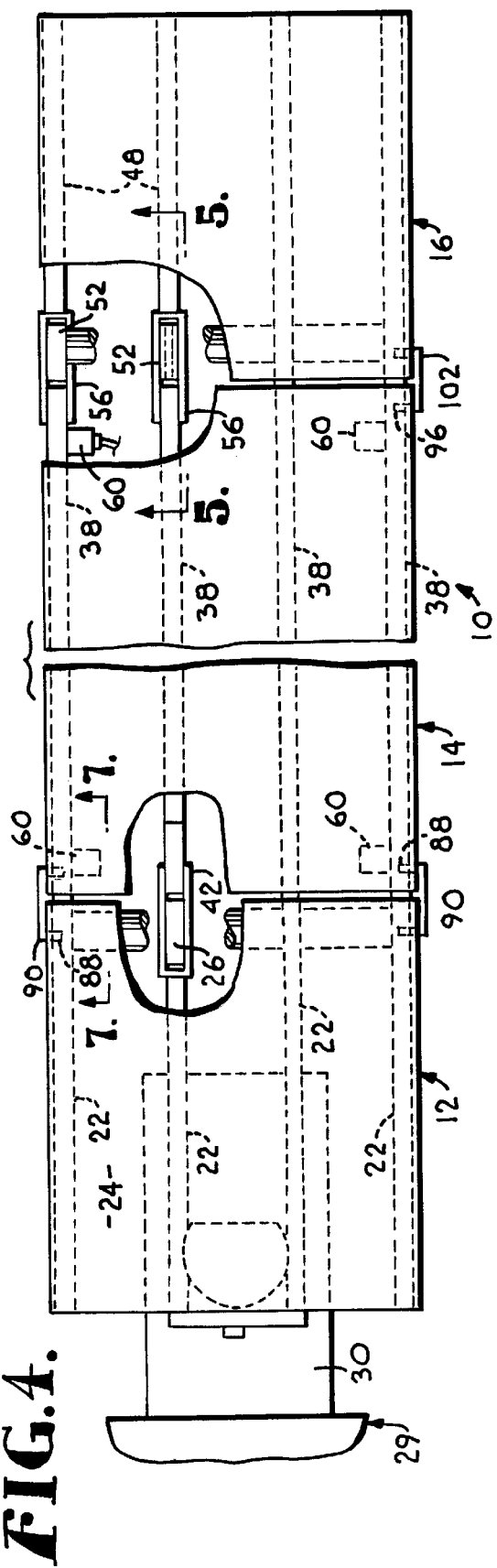
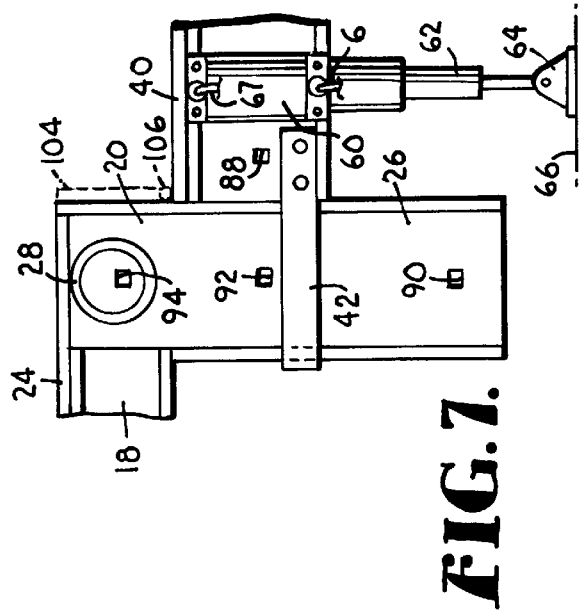
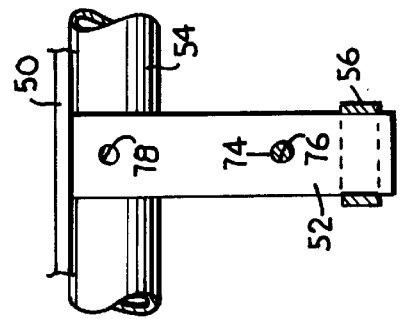
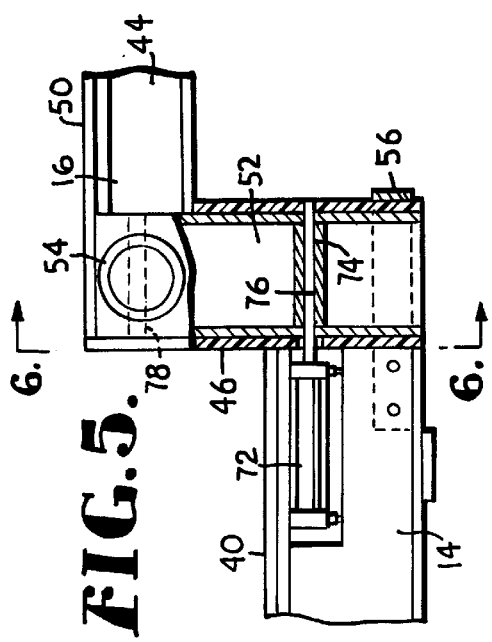

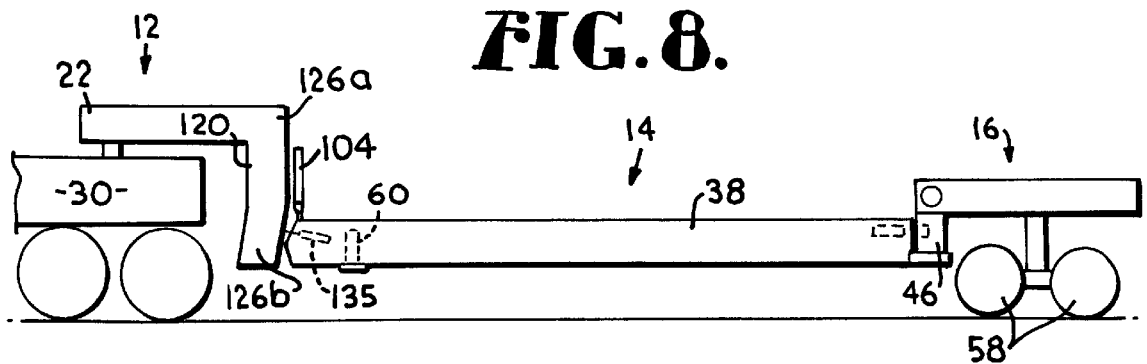
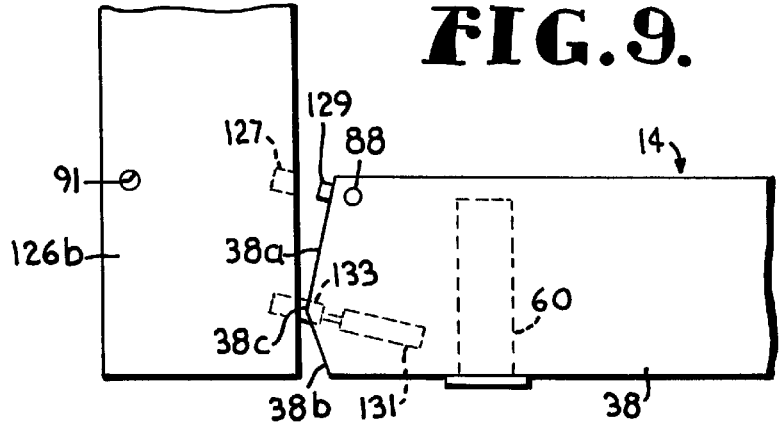
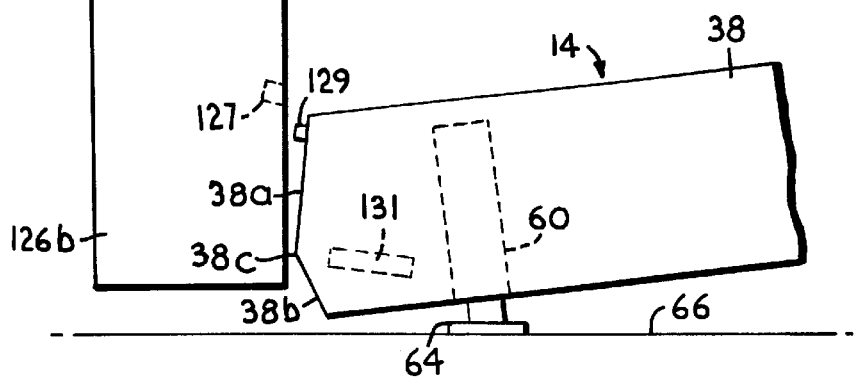

OVER THE ROAD TRAILER WITH ADJUSTABLE BED CONFIGURATION

FIELD OF THE INVENTION

This invention relates generally to highway trailers of the type used to transport large equipment such as farm combines over highways and other roadways. More particularly, the invention is directed to a trailer that is specially constructed to convert to different configurations, including a double drop deck configuration and a step deck configuration.

BACKGROUND OF THE INVENTION

Various trailer bed configurations have been used for transporting large farm combines and other heavy machinery from one place to another. The equipment that needs to be hauled has increased in both size and weight in recent years. Accordingly, trailers have had to be enlarged and strengthened in order to handle both the increased size and weight. The trailer design also must comply with height limitations so that the equipment that is carried is able to clear overpasses and overhead utility lines.

A trailer configuration that is conunonly known as a double drop deck configuration has achieved considerable popularity. In this configuration, there is a gooseneck section in the front coupled to the highway tractor that pulls the trailer. A relatively long center section provides a main deck that is lower than the deck of the gooseneck section. A rear section mounted on wheels has a relatively short deck that is raised above the level of the center deck. Thus, in the double drop deck trailer, the center deck that carries heavy equipment is dropped below the level both of the gooseneck deck and the rear deck.

The double drop deck trailer has advantages in many applications. The center deck is relatively low, so tall equipment can be transported in compliance with maximum height limitations. However, the gooseneck and rear decks are not available for carrying the large equipment because they are at a higher level than the center deck. Consequently, only the length of the center deck can be used for the large equipment. If timber, pipe or other cargo that is longer than the center deck is to be carried, the double drop deck trailer is not suitable. This is a serious limitation as to the application of the double drop deck trailer.

Another popular configuration is known as a step deck configuration. A step deck trailer has the center and rear decks at the same elevation so that longer cargo can be carried using the combined length of both decks. However, the rear deck must be high enough to accommodate the underlying trailer wheels, and the center deck must be at the same elevation. The result is that the main bed area is necessarily higher than the center deck in a double drop deck trailer. Therefore, the step deck trailer cannot carry equipment as tall as a double drop deck trailer can carry. Also, the gooseneck deck is still not available in a step deck trailer because it is above the center deck level. Step deck trailers are useful primarily to haul long pipes, timbers and other long loads that do not have height problems.

Still another trailer configuration is a straight deck configuration in which all of the decks are at the same level to provide one long deck surface extending the entire length of the trailer. While this configuration has advantages in some applications, such as when extremely long cargo is carried, the bed must be relatively high so that it is able to clear the wheels. Thus, straight deck trailers are not suitable for hauling tall equipment and are mainly used only to handle extremely long loads.

Loading of cargo onto existing trailers can also present problems. In order to load cargo onto a double drop deck trailer from the back, ramps are needed first to load the cargo up onto the back deck and then down onto the main bed. The inconvenience involved in this process has led to front loading systems which accommodate disconnection of the gooseneck from the center section so that the cargo can be loaded directly onto the main bed from the front. However, the systems that have been used for connection and disconnection of the gooseneck section have been complicated, expensive and time consuming.

SUMMARY OF THE INVENTION

The present invention has, as its principal object, the provision of a single trailer that is adjustable between different bed configurations to obtain the advantages of different types of trailers in a single trailer construction.

More specifically, one object of the invention is to provide a trailer that is specially constructed such that it can be converted between a double drop deck configuration and a step deck configuration. This allows the height advantage of a double drop deck trailer to be used when needed and the length advantage of a step deck trailer to be used when needed. For example, if a tall farm combine or other tall machinery is to be transported, the double drop deck configuration can be used. Alternatively, in an application involving pipe or other cargo that is too long to be transported on a double drop deck trailer, the step deck configuration can be used.

Another important object of the invention is to provide a trailer of the character described that can also be converted to a single deck configuration, thus accommodating a situation where extremely long cargo must be transported.

It is a further object of the invention to provide a trailer of the character described that can be quickly, easily and safely converted between the different configurations and used safely and effectively in each different configuration.

A still further object of the invention is to provide a trailer having a special connection between the main bed and the gooseneck section to enable detachment of the gooseneck so that cargo can be directly loaded onto and unloaded from the main bed from the front.

In accordance with the invention, a front gooseneck trailer section, a center section and a rear section are all constructed using four horizontal beams. The gooseneck and rear sections have upright portions formed by spaced apart legs that are received in U-shaped guide brackets on the front and rear ends of the center section. Due to this construction, the legs are able to slide in the brackets to adjust the center section up and down to different trailer configurations, preferably including a double drop deck configuration, a step deck configuration, and a straight deck configuration.

The center section may be provided with hydraulic j acks at its forward and rearward ends to permit adjustment between the different configurations to be quickly and easily carried out. Hydraulic latching cylinders mounted on the center section have rods that may be extended into passages in the legs of the gooseneck and rear sections to lock the center section rigidly in place. As an additional safety and reliability measure, a manual locking system includes U-shaped bars that maybe manually applied into openings in the different trailer sections in order to lock them together in cooperation with the locking cylinders.

Another aspect of the invention is a special connection between the gooseneck section and the main bed. Pegs which normally fit in passages to assist in connecting these two sections together can be separated by rocking action provided by strategically located cylinders. After the sections have been detached by withdrawal of the pegs from the passages, the front of the bed section can be lowered to the ground where it is easily accessible for the loading and unloading of cargo.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a diagrammatic side elevational view of a trailer constructed according to a preferred embodiment of the present invention disposed in a double drop deck configuration, with the break lines indicating continuous length;

FIG. 2 is a diagrammatic side elevational view similar to FIG. 1, but showing the trailer in a step deck configuration, with the break lines indicating continuous length;

FIG. 3 is a diagrammatic side elevational view similar to FIGS. 1 and 2, but showing the trailer in a straight deck configuration, with the break lines indicating continuous length;

FIG. 4 is a top plan view of the trailer in the double drop deck configuration, with portions broken away for purposes of illustration and the break lines indicating continuous length;

FIG. 5 is a fragmentary sectional view on an enlarged scale taken generally along line 5—5 of FIG. 4 in the direction of the arrows with portions broken away to show internal details;

FIG. 6 is a fragmentary sectional view taken generally along line 6—6 of FIG. 5 in the direction of the arrows;

FIG. 7 is a fragmentary sectional view on an enlarged scale taken generally along line 7—7 of FIG. 4 in the direction of the arrows;

FIG. 8 is a diagrammatic side elevational view of a modified trailer which differs in construction from the trailer of FIGS. 1–7 principally in that a special detachable connection between the front section and the main trailer bed is provided;

FIG. 9 is an enlarged fragmentary side elevational view of the special connection provided in the trailer of FIG. 8, with the detachment cylinders extended to effect rocking action withdrawing the pegs of the connection from the passages that normally receive them; and FIG. 10 is a fragmentary side elevational view similar to FIG. 9, but with the front end of the main trailer bed lowered adjacent to the ground after having been detached from the front gooseneck section of the trailer.

DETAILED DESCRIPTION OF THE INVENTION

Referring now to the drawings in more detail and initially to FIGS. 1–3 in particular, numeral 10 generally designates a trailer constructed in accordance with a preferred embodiment of the present invention. The trailer 10 has three sections, including a gooseneck front section 12, a center section 14, and a rear section 16. The gooseneck section 12 is L-shaped and includes a horizontal portion 18 and an upright or vertical portion 20 which extends downwardly from the rearward end of the horizontal portion 18. With additional reference to FIG. 4 in particular, the horizontal portion 18 includes four horizontal beams 22 which are spaced apart and parallel to one another. A deck plate 24 may be secured to the tops of the beams 22.

As best shown in FIGS. 4 and 7, the vertical portion 20 is constructed using four vertical columns or legs 26 which are adjacent to and aligned with the horizontal beams 22. A horizontal torque tube 28 is formed as part of the gooseneck section 12 at the intersection between the horizontal portion 18 and the vertical portion 20. The beams 22 and legs 26 may be in the form of hollow box beam structures or any other suitable structure.

The trailer 10 is pulled by a highway tractor 29 which is connected with the gooseneck section 12. The tractor 29 includes a frame 30 mounted on wheels 32. A fifth wheel connection 34 is mounted on the frame 30. The forward end of the horizontal portion 18 of the gooseneck section 12 is provided on its underside with a suitable coupling 36 which may be detachably connected with the fifth wheel 34 in order to connect the tractor 29 with the trailer 10.

The center section 14 of the trailer 10 takes the form of a straight section which may have any suitable length. With particular reference to FIG. 4, the center section 14 is constructed using four horizontal beams 38 which are spaced apart and parallel to one another. The forward end of the center section 14 is adjacent to the upright portion 20 of the gooseneck 12, and the beams 38 of the center section are adjacent to and aligned with the vertical legs 26 of portion 20. If desired, a bed or deck plate 40 may be mounted on top of the beams 38 to provide a flat bed extending the entire length and width of the center section 14.

The forward end of each of the beams 38 is provided with a U-shaped guide bracket 42. As best shown in FIG. 4, each bracket 42 has a shape and location to closely receive one of the vertical legs 26 of the gooseneck portion 20. The brackets 42 receive the legs 26 in a manner allowing the brackets to slide up and down on the legs while maintaining the deck plate 40 of the center section in a generally horizontal orientation. The guide brackets 42 maybe constructed of any suitable material such as steel and may be connected with the beams 38 in any suitable manner.

The rear section 16 of the trailer is adjacent to the rearward end of the center section 14 and is an L-shaped structure having a horizontal portion 44 and a vertical portion 46 extending downward 14 from the forward end of the horizontal portion 44. As shown in FIG. 4, the horizontal portion 44 of the rear section 16 includes four horizontal beams 48 which are spaced apart and parallel to one another. A deck plate 50 may be secured on top of the beams 48 to provide a solid deck surface if desired. The vertical portion 46 includes four vertical columns or legs 52 connected to the four horizontal beams with a torque tube 54. The legs 52 are adjacent to and aligned with the beams 38 of the center trailer section 14. The horizontal torque tube 54 is included in the rear trailer section 16 at the intersection between the horizontal portion 44 and vertical portion 46.

The rearward end of each of the center section beams 38 is provided with a U-shaped guide bracket 56. The brackets 56 are located and constructed to closely receive the legs 52 of the rear trailer section 16. The legs 52 are received in the brackets 56 in a manner allowing the rearward end of the center section 14 to move upwardly and downwardly on the vertical portion 46 of the rear trailer section 16.

The trailer 10 includes a plurality of wheels 58 on which the rear trailer section 16 is mounted. The wheels 58 are suitably connected with the underside of the horizontal portion 44 of the rear trailer section 16.

Due to the sliding fit of the legs 26 in brackets 42 and legs 52 in brackets 56, the center section 40 is adjustable upwardly and downwardly relative to the front gooseneck section 12 and the rear section 16. The up and down adjustment of the center section 14 is effected by four hydraulic jacks 60. As best shown FIG. 4, two of the jacks 60 are mounted near the forward ends of the two outside beams 38 on the center section 14. The other two jacks 60 are connected with the two outside beams 38 near their rearward ends. As shown particularly in FIG. 7, each jack 60 has a telescoping leg assembly 62 which is hydraulically extended and retracted. Each leg assembly 62 has a shoe 64 on its lower end which may be extended into contact with a surface 66 such as a roadway surface. Each jack 60 has hydraulic lines 67 for applying hydraulic fluid to the jack and relieving hydraulic pressure from the jack. Once the leg assembly 62 has been extended far enough that the shoe 64 is in contact with surface 66, additional extension of the jack causes the center section 14 to be jacked upwardly. Conversely, when the leg assemblies 62 are retracted, the weight of the center section 14 causes it to drop along the vertical portions 20 and 46 of the front and back trailer sections.

The construction of the trailer 10 and the ability to adjust the center section 14 upwardly and downwardly allows the trailer to be arranged in different configurations for different loading applications. FIG. 1 illustrates a double drop deck configuration of the trailer in which the bed of the center section 14 is located at a level below the elevation of the gooseneck deck plate 24 and the rear section deck plate 50. In this configuration, the center section 14 is at its lowest elevation so that the trailer is well suited to transport tall equipment on the center section 14 in the double drop deck configuration.

FIG. 2 shows the trailer 10 adjusted to a step deck configuration wherein the center section 14 is raised by the hydraulic jacks 60 from its elevation in the double drop deck configuration. In the step deck configuration, the deck plate 40 of the center section is at substantially the same elevation as the deck plate 50 of the rear trailer section 16. The center section bed is somewhat lower than the deck 24 of the gooseneck section 12 in the step deck configuration. Because both the center section deck 40 and the rear section deck plate 50 are at the same elevation, this configuration is well suited to handle long cargo such as pipes that require the length available on both of the decks 40 and 50 to accommodate the pipe length.

FIG. 3 depicts the trailer adjusted to a straight deck configuration in which the front end of the center section 14 is raised by the front jacks 60 until its bed 40 is aligned with and forms a continuation of the gooseneck deck plate 24. The center bed 40 remains aligned with the rear deck 50 so that the entirety of the trailer length provides a single flat bed that is well suited to accommodate extremely long loads. In this configuration, the trailer bed may be inclined somewhat from horizontal due to the tractor wheels 32 normally being larger than the trailer wheels 58.

The trailer 10 may be releaseably latched in each of the different configurations by both a power operated latching system and a manual latching system. The power operated latching system includes a pair of front hydraulic cylinders 70 (FIG. 1) which may be mounted in horizontal orientations to the two inside beams 38 adjacent to their forward ends. Two additional hydraulic cylinders 72 are mounted to the same two beams 38 adjacent to their rearward ends. The cylinders 70 and 72 may be located inside of the beams 38 if desired.

As best shown in FIG. 5, each of the rear cylinders 72 has an extensible and retractable piston rod 74 which serves as a latching bar for the center section 14. The two inside legs 52 which are aligned with the cylinders 72 are provided with lower passages 76 that align with the piston rod 74 when the center section 14 is in the double drop deck configuration shown in FIG. 1. The same legs 52 each have upper passages 78 that align with the piston rod 74 when the center section 14 is raised such that its deck 40 aligns with the rear section deck 50 in either the step deck configuration of FIG. 2 or the straight deck configuration of FIG. 3.

When the center section 14 has been adjusted to the double drop deck position, the cylinders 72 can be extended to insert their piston rods 74 through the lower passages 76, thereby latching the rearward end of the center section in the double drop deck position. Similarly, when the center section is in either of the configurations shown in FIGS. 2 or 3, the cylinder 72 can be extended to insert rods 74 through passages 78. This locks the center section with its bed 40 in alignment with the rear deck 50.

With reference to FIG. 1 in particular, the forward cylinders 70 operate similarly. Each of the cylinders 70 has a piston rod 80 that serves as a latching bar. The two inside gooseneck legs 26 that align with the forward cylinders 70 are each provided with a lower passage 82 that aligns with rod 80 in the double drop deck position shown in FIG. 1. Each of these legs 26 has an intermediate passage 84 which is spaced above the lower passage 82 to align with the rod 74 in the step deck configuration shown in FIG. 2. Each of these legs 26 is also provided with an upper passage 86 that aligns with rod 74 in the straight bed configuration shown in FIG. 3. By extending the cylinders 70 to insert the rods 80 through one of the aligned passages 82, 84 or 86, the forward end of the center section 14 can be secured at the desired elevation relative to the gooseneck section 12. A suitable source (not shown) of hydraulic fluid is provided along with a conventional hydraulic pump and fluid lines and valves for operating the hydraulic jacks 60 and the cylinders 70 and 72.

In addition to the power operated latching system provided by the cylinders 70 and 72, the trailer includes as an additional safety measure a manually applicable latching system. As best shown in FIG. 4, the outside surface of each of the outside beams 38 of the center trailer section 14 is provided with an opening 88. Each opening 88 has a size and configuration to closely receive one leg of a U-shaped latching bar 90 that may be manually applied. As shown additionally in FIGS. 2 and 3, the outside surface of each of the outside legs 26 on the gooseneck section is provided with a lower opening 91, an intermediate opening 92 and an upper opening 94. The openings 91 are aligned side by side with openings 88 when the trailer is in the double drop deck configuration of FIG. 1. Then, the latching bars 90 can be applied with their legs fitting closely in the openings 88 and 91 to latch the center section in place relative to the legs 26.

Similarly, in the step deck configuration shown in FIG. 2, openings 92 align side by side with openings 88 so that the latching bars 90 can be applied to latch the center section at the proper elevation to the legs 26. The upper openings 94 align side by side with openings 88 in the straight deck configuration of FIG. 3. Again, the latching bars 90 can be manually applied with their legs received in openings 88 and 94 to latch the center section in the straight deck configuration.

A similar manual latching system is provided to effect releaseable latching between the rearward end of the center section 14 and the rear deck section 16. The outside surfaces of the outside beams 38 are provided with openings 96 (FIG. 4) near their rearward ends. The outside surface of each of the outside legs 52 is provided with a lower opening 98 and an upper opening 100 (See FIG. 2). Opening 96 is aligned with and located beside opening 98 when the trailer is in the double drop deck configuration. Then, a U-shaped latching bar 102 can be manually applied with its legs received in the aligned openings 96 and 98. Similarly, in the trailer configurations shown in FIGS. 2 and 3, opening 96 is in alignment with the upper opening 100. Then, the latching bar 102 can be applied with its legs received in openings 96 and 100 to latch the rearward end of the center section at the desired elevation relative to the rear trailer section 16.

The trailer 10 can be adjusted from one configuration to another configuration by extending the hydraulic jacks 60 until the shoes 64 are lowered onto the roadway surface 66. Then, all of the latching bars 90 and 102 should be manually removed. Also, all of the cylinders 70 and 72 should be retracted to withdraw the piston rods 74 and 80 from the latching passages. The jacks 60 can then be appropriately extended or retracted to raise or lower the corresponding end of the center section 14 to the desired elevation relative to the front and rear sections of the trailer. For example, to adjust the trailer from the configuration of FIG. 1 to the configuration of FIG. 2, all of the jacks 60 should be extended until the center section 14 is raised relative to the vertical portions 20 and 46. When the position of FIG. 2 has been reached, cylinders 70 and 72 can be extended to latch the center section in place, and the manual latching bars 90 and 102 can be applied to provide additional latching.

To adjust the trailer from the position of FIG. 2 to the position of FIG. 3, the front latching cylinder 72 should be retracted and the front latching bars 90 should be removed, and the two front jacks 60 can be extended to raise the front end of the center section 14 to the desired position. Then, cylinders 72 can be extended and bars 90 can be applied to latch the center section in place.

The center section 14 of the trailer can be lowered as desired by extending the jacks 60 until the shoes 64 are located on the roadway surface 66. Then, the latching cylinders should be retracted and the latching bars should be released. The jacks 60 can be slowly retracted so that the weight of the center section 14 lowers it in unison with the retraction of the jacks 60 until the center section has reached the desired elevation. The latching cylinders can then be extended and the manual latching bars can be applied as described.

The present invention also contemplates loading of the cargo from the front of the center section 14. The gooseneck section 12 can be disconnected from the center section and separated from it by pulling the tractor forward after disconnection. In this respect, a special connection (shown in FIGS. 8–10) between the front end of section 14 and the bottom end of the gooseneck upright portion 20 can be provided to allow disconnection of sections 12 and 14. A hinged ramp 104 (FIG. 7) may be hinged at 106 to the forward end of plate 40 so that it can be swung down about the hinge 106 to provide a ramp for loading cargo from ground level directly onto the front end of center section 14.

To facilitate loading from the rear, another hinged ramp 108 may be hinged at 110 to plate 40 near its back end. In the double drop deck configuration of the trailer, cargo can be loaded from the rear onto the rear section 16 on ramps (not shown), and ramp 108 can be swung upwardly about hinge 110 to provide a ramp for moving the cargo from deck 50 onto the main bed 40. In order to reach up to deck 50, ramp 108 can be constructed as an extensible member, or the hinge 110 can be made so that it can be adjusted rearwardly to allow ramp 108 to reach the back deck 50.

FIGS. 8–10 depict an alternative embodiment of the trailer 10 which differs only in that the gooseneck front section 12 connects with the forward end of the center section 14 in a different manner than previously described in order to facilitate detachment of section 12 from section 14. This allows the forward end of center section 14 to be lowered to the ground so that cargo can be loaded and unloaded directly onto and off of section 14. This in turn eliminates the need for ramps to load cargo onto the rear section 16 and, in the case of the double drop deck configuration, to move the cargo onto section 14 from section 16.

With reference to FIG. 8 in particular, this embodiment has the gooseneck section 12 provided with a generally vertical portion 120 in which the columns or legs 126 are bent. The upper portion 126a of each leg 126 extends at a right angle downwardly from the corresponding beam 22. Each leg 126 has a lower portion 126b which is bent forwardly from the lower end of upper portion 126a. Portion 126b has a rearwardly facing surface 126c (FIGS. 9 and 10) which is offset from a vertical orientation when the trailer is attached to the frame 30 of a highway tractor, as shown in FIG. 1. The two legs 126 on the outside are each provided with a passage 127 extending into surface 126c.

The forward ends of the horizontal beams 38 of center section 14 have a modified shape which includes an upper surface 38a and a lower surface 38b intersecting at a vertex 38c. Surface 38a is a flat surface which is oriented at the same angle as the surface 126c when the trailer is connected and is being towed. The surfaces 38a and 126c then abut one another as shown in FIG. 8. The lower surface 38b angles rearwardly and downwardly from the vertex 38c.

Each of the outside beams 38 is provided with a peg 129 which projects forwardly from surface 38a near its upper end. The pegs 129 have sizes, shapes and locations to fit closely in the passages 127 when the trailer is being towed. This helps to connect sections 12 and 14 along with the latch bars 90 which are received in openings 88 and 91.

The forward end of each of the outer beams 38 is equipped with a hydraulic cylinder 131 having an extensible and retractable piston rod 133. Each cylinder 131 is located such that its rod 133 acts at the vertex 38c. When the rods 133 are extended, they push against the leg surface 126c adjacent to the vertex 38c.

In normal operation, the embodiment of FIGS. 8–10 is used in the manner previously described. It can be used in a double drop deck configuration, a step deck configuration or a straight deck configuration.

In order to detach the gooseneck front section 12 from center section 14, the latch bars 90 are first removed. Cylinders 131 are extended so that their rods 133 enter holes (not shown) in surface 126c. The front jacks 60 are extended to provide a rocking action causing the withdrawal of pegs 129 from passages 127. This is shown in FIG. 9. The two front jacks 60 may be extended to support the forward end of the center section 14. Blocking should be placed between the tractor frame 30 and the gooseneck section 12. The cylinders 131 can then be retracted and the jacks can be retracted to lower the front end of section 14 to the ground 66, as shown in FIG. 10. The tractor can then be pulled forwardly to pull section 12 away, and the ramp 104 can be swung downwardly to allow cargo to be loaded directly onto the forward end of section 14. Ramp 104 can be operated by a hydraulic cylinder 135 (FIG. 8) if desired.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A trailer for connection with a highway tractor for transporting heavy equipment, the trailer comprising:

a gooseneck section having a generally horizontal portion for detachable coupling to the tractor and a generally upright portion extending downwardly from said horizontal portion at a back end thereof;

a rear section mounted on wheels and having a generally horizontal deck portion and a generally vertical portion extending downwardly from said deck portion;

a center section presenting a generally horizontal bed extending between said gooseneck and rear sections, said center section being connected with said upright and vertical portions for movement between a first position providing a double drop deck configuration wherein said bed is at a lower elevation than said horizontal and deck portions, and a second position providing a step deck configuration wherein said bed is at a lower elevation than said horizontal portion and substantially the same elevation as said deck portion;

said upright portion of the gooseneck section including first and second passages spaced vertically apart; and a power element on said center section having an extensible and retractable latch bar located to align with said first passage in the first position of the center section and with said second passage in the second position of the center section, said power element being operable to selectively extend said latch bar into an aligned passage to alternately latch the center section in the first and second positions thereof to said gooseneck section;

wherein said upright portion of the gooseneck section includes a plurality of generally upright legs; said center section includes a plurality of generally horizontal beams aligned with the respective legs; each said beam includes a forward end adjacent to the corresponding leg; and the forward end of each said beam is provided with a guide bracket extending substantially around the corresponding leg and accommodating up and down movement of the leg therein.

2. A trailer as set forth in claim 1, including a power mechanism operable to move said center section between said first and second positions thereof.

3. A trailer as set forth in claim 1, including a plurality of power operated jacks on said center section acting to move the center section between said first and second positions thereof.

4. A trailer as set forth in claim 3, including a latch mechanism operable to releaseably secure said center section alternately in the first and second positions thereof.

5. A trailer as set forth in claim 1, including a latch mechanism operable to releaseably secure said center section alternately in the first and second positions thereof.

6. A trailer as set forth in claim 1, including:

third and fourth passages in said vertical portion of the rear section spaced vertically apart;

a second power element on said center section having an extensible and retractable latch bar located to align with said third passage in the first position of the center section and with said fourth passage in the second position of the center section, said second power element being operable to selectively extend the latch bar thereof into an aligned passage to alternatively latch the center section in the first and second position thereof to said rear section.

7. A trailer as set forth in claim 6, including: irst and second openings in said upright portion of the gooseneck section spaced vertically apart;

a third opening in said center section located to align with said first opening in the first position of the center section and with said second opening in the second position of the center section; and a manual latch barTantmally applicable to extend into said third opening and an aligned first or second opening to alternatively latch the center section in first and second positions thereof to said gooseneck section. A trailer as set forth in claim 1, including: first and second openings in said upright portion of the gooseneck section spaced vertically apart;

a third opening in said center section located to align with said first opening in the first position of the center section and with said second opening in the second position of the center section; and a manual latch bar manually applicable to extend into said third opening and an aligned first or second opening to alternatively latch the center section in first and second positions thereof to said gooseneck section.

8. A trailer as set forth in claim 1, wherein said center section is connected with said upright and vertical portions for movement to a third position providing a straight deck configuration wherein said bed is substantially aligned with said horizontal and deck portions.

9. A trailer as set forth in claim 8, including a power mechanism operable to move the center section among said first, second and third positions.

10. A trailer as set forth in claim 9, including a latch mechanism operable to alternately secure said center section in the first, second and third positions thereof.

11. A trailer as set forth in claim 8, including a latch mechanism operable to alternately secure said center section in the first, second and third positions thereof.

12. A trailer as set forth in claim 1, wherein:

said vertical portion of the rear section includes a plurality of generally vertical leg members aligned with the respective beams;

each said beam includes a rearward end adjacent to the corresponding leg member; and the rearward end of each said beam is provided with a guide bracket extending substantially around the corresponding leg member and accommodating up and down movement of the leg member therein.

13. A trailer for connection with a highway tractor for transporting heavy equipment, said trailer comprising:

a gooseneck front section for coupling to the tractor, said gooseneck section having a generally horizontal portion and a generally upright portion;

a center section presenting a generally horizontal bed and having a forward end connected with said upright portion for up and down adjustable movement thereon;

rear section mounted on wheels and having a generally horizontal deck portion and a generally vertical portion to which a rearward end of said center section is connected for up and down adjustable movement thereon;

a power mechanism operable to move said center section on said upright portion and said vertical portion between a first position providing a double drop deck configuration wherein said bed is at a lower elevation than said horizontal and deck portions, and a second position providing a step deck configuration wherein said bed is at a lower elevation than said horizontal portion and substantially the same elevation as said deck portion;

said upright portion of the gooseneck section including first and second passages spaced vertically apart; and a power element on said center section having an extensible and retractable latch bar located to align with said first passage in the first position of the center section and with said second passage in the second position of the center section, said power element being operable to selectively extend said latch bar into an aligned passage to alternately latch the center section in the first and second positions thereof to said gooseneck section;

wherein said upright portion of the gooseneck section includes a plurality of generally upright legs; said center section includes a plurality of generally horizontal beams aligned with the respective legs; each said beam includes a forward end adjacent to the corresponding leg; and the forward end of each said beam is provided with a guide bracket extending substantially around the corresponding leg and accommodating up and down movement of the leg therein.

14. A trailer as set forth in claim 13, wherein said power mechanism is operable to move said center section to a third position providing a straight deck configuration wherein said bed is substantially aligned with said horizontal and deck portions.

15. A trailer as set forth in claim 14, including a latch mechanism operable to alternately secure said center section in the first, second and third positions thereof.

16. A highway trailer for hauling heavy equipment over the road, said trailer comprising:

a front gooseneck section having a generally horizontal portion and a generally upright portion;

a center section having forward and rearward ends and a generally horizontal bed, said center section being connected at the forward end thereof with said upright portion for generally vertical movement thereon;

a rear section having a generally horizontal deck portion mounted on wheels and a generally vertical portion to which the rearward end of said center section is connected for generally vertical movement thereon;

a latch mechanism operable to releaseably secure said center section at a first position providing a double drop deck configuration wherein said bed is at a lower elevation than said horizontal and deck portions, and a second position providing a step deck configuration wherein said bed is at a lower elevation than said horizontal portion and substantially the same elevation as said deck portion;

said upright portion of the gooseneck section including first and second passages spaced vertically apart; and a power element on said center section having an extensible and retractable latch bar located to align with said first passage in the first position of the center section and with said second passage in the second position of the center section, said power element being operable to selectively extend said latch bar into an aligned passage to alternately latch the center section in the first and second positions thereof to said gooseneck section;

wherein said upright portion of the gooseneck section includes a plurality of generally upright legs; said center section includes a plurality of generally horizontal beams aligned with the respective legs; each said beam includes a forward end adjacent to the corresponding leg; and the forward end of each said beam is provided with a guide bracket extending substantially around the corresponding leg and accommodating up and down movement of the leg therein.

17. A trailer as set forth in claim 16, wherein said latch mechanism is operable to releaseably secure said center section at a third position providing a straight deck configuration wherein said bed is substantially aligned with said horizontal and deck portions.

* * * * *